Dec. 5, 1944.  E. A. KAMP  2,364,298
SEWAGE TREATMENT
Filed Dec. 20, 1941  2 Sheets-Sheet 2

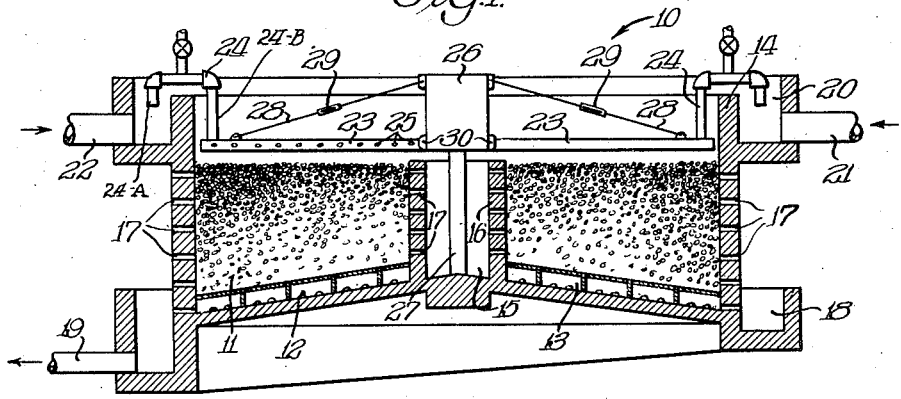
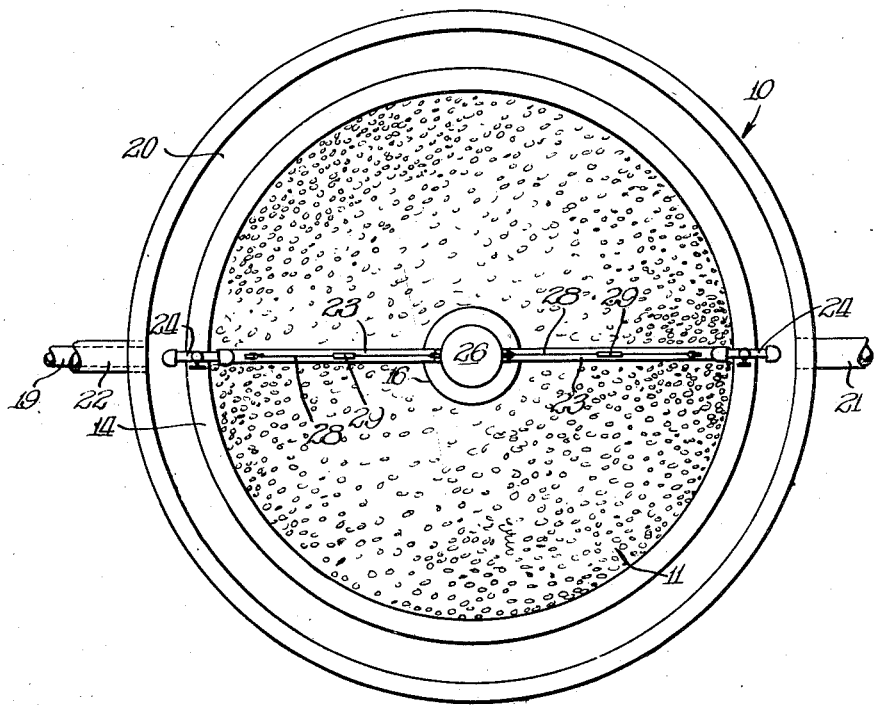

INVENTOR.
Ewald A. Kamp,
BY

Patented Dec. 5, 1944

2,364,298

UNITED STATES PATENT OFFICE 2,364,298

SEWAGE TREATMENT

Ewald A. Kamp, Chicago, Ill., assignor to Graver Tank & Mfg. Co., Inc., a corporation of Delaware Application December 20, 1941, Serial No. 423,707

2 Claims. (Cl. 210—7)

This invention relates to the treatment of sewage and similar materials. It has particular reference to trickling filters equipped with rotary distributors, and will be described in such connection.

It is an object of my invention to improve the distribution and treatment of sewage in such filters.

Another object is to conserve liquid head in the operation of such filters.

Another object is to eliminate objectionable units of piping, nozzles, fittings, seals and other attachments.

Another object is to simplify and improve the application of a high rate flow, providing greater uniformity of dosage while reducing head loss and cost of distributor structures.

Other objects are, to provide a peripheral siphon intake channel, to feed the unfiltered sewage to said channel, to circulate filtered material to said channel, to cause a flow or treatment of material in said channel, to maintain the head or level of liquid in said channel at predetermined values, and to withdraw material from said channel at predetermined points.

Other objects are, by feeding or circulating material to a channel and withdrawing material therefrom to maintain proper siphon action in a floating or rolling distributor, to cause flow through one siphon distributor at one time and through another at another time, to maintain a proper rate of trickling flow through the filter, and, if necessary, to flush or wash the filter either intermittently or continuously.

Still other objects will become apparent upon consideration of the description and drawings.

In the drawings,

Figure 1 is a sectional elevation of a filter constructed in accordance with this invention.

Figure 2 is a plan view of the apparatus shown in Figure 1.

Figure 3:
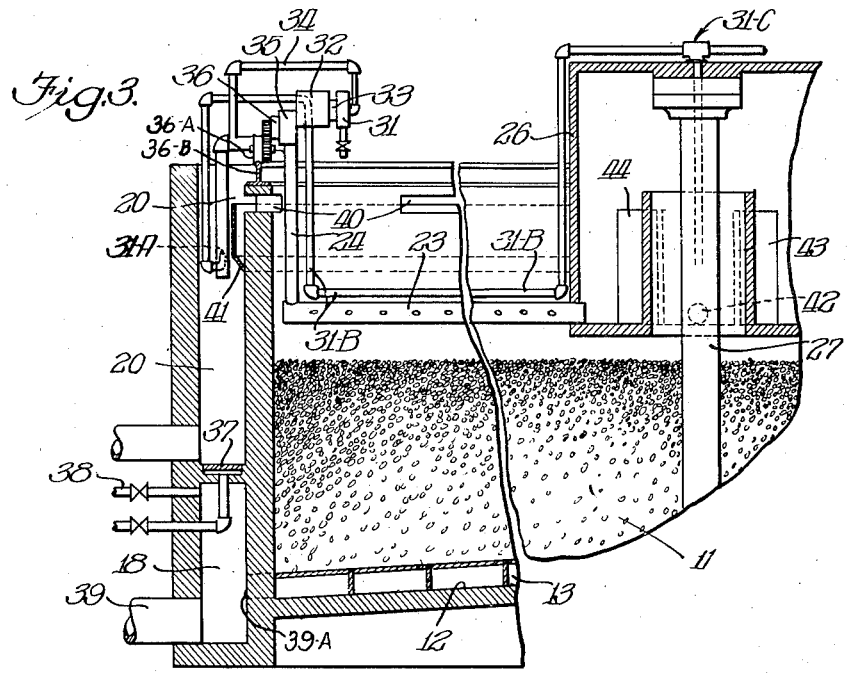
Figure 3 is a partial, sectional elevation of a modified filter constructed in accordance with this invention.

The trickling filter 10 comprises a circular filter bed 11 of crushed stone or other suitable material, supported by an inclined, self-draining bottom 12 and underdrain 13, and confined by a wall 14. There may be a central well 15 with a surrounding, bed-retaining wall 16. Both walls 14 and 16 may be imperforate, or they may have air passages 17 formed therein. Filtered material from the underdrain enters a peripheral collecting channel 18 surrounding the filter bottom and discharging through a pipe 19, whereas material to be distributed over the filter surface is received in the peripheral channel 20 surrounding the filter. This channel receives the sewage to be filtered through a pipe 21. It also receives recirculated material that has been filtered before, through a pipe 22, which preferably enters the channel separately, and at a point diametrically opposite to the entrance of the sewage pipe 21. The channel 20 is preferably located adjacent the top of the filter, or at least with the top of the channel adjacent the top of the filter and upwardly spaced therefrom.

A number of pipes 23 receive material to be filtered from the top channel 20, over the inner wall of the channel, by means of a travelling siphon 24 at the outer end of each pipe 23. The pipes 23 distribute the material received through the discharge ends 24—B of the siphons by means of spaced discharge nozzles 25, which at the same time may be so located and constructed as to cause the pipes to travel horizontally by jet reaction. For this purpose, the inner ends of the distributor pipes are secured to a hub 26 which is located in the center of the filter 10 and rotatably supported on a central vertical pier 27. The central hub may also support the outer ends, or intermediate parts of the pipes by guy wires or cables 28, having turnbuckles 29. The turnbuckles may, among other things, serve as a convenient means to adjust the depth to which the free intake ends 24—A of the siphons 24 dip into the liquid in the top channel 20; and in order to facilitate such adjustment, the pipes 23 may be pivoted to the hub 26 by hinges 30.

In operation the peripheral channel 20, as mentioned, receives both sewage to be filtered and recirculated material that has been filtered before, and discharges both materials over the trickling filter bed 11 by means of the siphon 24 and distributor 23. The flow of sewage to be filtered is subject to great variations in composition and amount. It tends to fall off during certain times of the day and mainly at night. In earlier plants, no provision was made for a return flow. The result was, stagnation and septicity of the sewage in the peripheral channel; the filter organisms were not provided with food during periods of lagging flow; they were moreover showered with a stale and septic sewage on resumption of the flow. These disadvantages are obviously avoided by the present method of operation.

In the modification of Figure 3, I show a pump 31, adapted to be driven by a motor 32 through a magnetic clutch 33 and when so driven, adapted to start the siphon 24 by means of a suction pipe 34 joined to the summit of the siphon. The same motor 32 may also drive or control the speed of the distributor arm 23 through speed reducing gearing 35 and a speed variator 36 and a traction wheel 36—A engaging a peripheral track 36—B. Instead of a motor-driven pump, I can, of course, use, among other things, an ejector type pump 31—A, operated by pressure fluid which may be supplied through the center support, by a pipe 31—B and rotary seal fitting 31—C.

I provide aerating diffusors 37 in the bottom of the top channel 20, in order to prevent the piling up of sludge in said channel especially if the material entering the same contains a high concentration of heavy solids. Such aerating diffusors may also serve to pre-aerate and thereby in some instances to pre-flocculate the material prior to its treatment in the trickling filter, so that the liquid and solids entering the filter may be partly stabilized and the load on the filter decreased. Such pre-aeration cannot be simply and economically achieved in center feed filters. The advantages of such preliminary treatment will be readily appreciated. It may serve to allow the treatment of sewage flows having occasional peak loads, on trickling filters which are relatively small and economical, the preliminary treatment being available at times of peak load. Preliminary flocculation could also be used continuously. It would relieve the load on the filter as a biological flocculating agent, and allow the filter organisms to cause better biological oxidation. Pre-aeration may serve to control the filter growth in the following manner. It is well-known that such growth is very complex and contains, generally speaking, a balance of aerobic and anaerobic organisms. The aerobic growth is the active and desired agent of biological purification in trickling filters, or at least the most important agent thereof. An anaerobic growth, however, is also present. Under certain unfavorable conditions, it may tend to overbalance the aerobic growth, jeopardizing the success of the filter. At such times the filter can be rectified by pre-aeration of the filter influent or recirculated material. In order to secure the full benefit of pre-flocculation or pre-aeration, I will generally make the channel for siphon intake and aeration deeper than necessary for the mere siphon action; I preferably use a channel which extends from the top of the filter downwardly over the whole, or at least a major portion of the filter depth. In some instances, I may use combined or concentric tank structures, comprising filtering and settling, coagulating, or aerating means within one another, the filter influent being siphoned from the last-mentioned means.

A deep channel 20 may have walls integral with those of the lower channel 18, it being necessary only to provide vent openings 38 for the latter.

I may also provide a lower channel 18 that is adapted alternately to carry the filter effluent and to receive filter backwash water or any other backwash fluid through a backwash header 39. The backwash fluid will then be distributed over the filter bottom 12 by the underdrain 13 connected to the channel 18 by openings 39—A; it will rise through the filter body 11, and finally spill over weirs 40 provided in the filter retaining wall above the filter body, and of course below the motor 32 and other operating parts. The weirs 40 may communicate with a launder 41 for the spent backwash fluid, which in turn may communicate with a pipe returning this spent water to the plant influent, or to any other convenient place. Incident to backwashing, the siphon 24 will preferably be broken, for instance, by stopping the return of filtrate to the channel 20, lowering the water level in that channel below the elevation of the siphon intake. A periodical backwash of the filter is advantageous for proper control of filter growth. The films of bacteria and other organisms, on the filter stones, are subject to constant regeneration; the organisms multiply and vegetate in the so-called zoogleal gel which in the case of trickling filters is a mixture of bodies of organisms, both living and dead, of different kinds, and their products of digestion and other life functions. This gel or film sometimes has a tendency to grow so abundantly as to unduly restrict the intersticts between the filter stones, which are needed for the trickling flow of the liquid and for supply of air and removal of carbon dioxide. Under such conditions, the quality of the filtrate falls off, and in extreme cases the filter may even be clogged to the extent that ponding occurs. Whenever such a tendency is observed, and preferably before extreme damage has been done, a backwash will serve to partly dislodge and remove the abundant growth; the rate of backwash, of course, being properly governed in a well-known manner.

Still another feature of the filter, shown in Figure 3, involves auxiliary distributing arms 42 which preferably radiate from the central hub 26, in addition to the arms 23. These auxiliary arms, as shown, are adapted to provide additional discharge, at times of exceptionally high flow rates in the sewage system, or at times when the filter dosage is intentionally increased by recirculation or otherwise, in order to flush the filter downwardly rather than by backwashing. For this purpose, I provide, preferably in the lower part of the central hub 26, an annular trough 43 divided into chambers by radial partitions 44 of predetermined height. Each of the aforementioned pipes 23, has an inner end portion which discharges into one of the chambers formed in the trough 43. In normal operation, the liquid head in that chamber is insufficient to allow the liquid to overflow over the partitions 44. However, raising the liquid level in the peripheral channel 20 results in an increased liquid head in the pipe 23 and in the trough 43, whereupon the liquid overflows and enters the auxiliary pipes, which communicate with the overflow chambers between the partitions 44. This device serves to distribute a greatly increased flow, it being a particular advantage that part of the distributing arms are arranged for inward flow and others for outward flow, whereby the distributing structure as a whole can be made relatively light and inexpensive. Since the rate of rotation of the distributor tends to be rapid at such an increased flow, whereas it may be intended to flush successive portions of the filter bed downwardly at a rapid rate of flow, the motor drive 32 will be slowed up by the gear variator 36 at such times; or in some instances, the variator may be so constructed as to actually cause the motor to slow up the rotation cased by the reaction jets. Instead of such a weir in the central part of the distributor structure there may be, of course, various other structures to provide such additional discharge.

Figure 4:
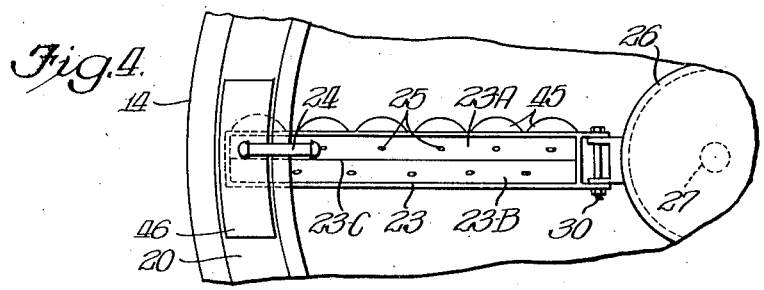
Figure 4 is a partial, plan view of another modified filter constructed in accordance with this invention.

In Figure 4, the distribtuor 23 is a rotating trough rather than a pipe. This trough has two parallel longitudinal compartments 23—A and 23—B separated by a weir 23—C. The siphon 24 supplies sewage to the first compartment 23—A. This has discharge nozzles 25 equipped with deflectors 45, causing a broader and more uniform spray. Such deflectors can also be used to upwardly adjust the angle at which the spray is projected into the air, the angle of discharge serving to control the pre-aeration of the spray, the reactive effect of the jet, and the speed of rotation. When using such upwardly discharging nozzles or deflectors, the nozzles adjacent to the tank periphery are likely at times to discharge over the tank wall, rather than onto the filter bed, especially when a strong wind is blowing. I control this tendency by installing the peripheral channel 20 inside the outer wall 14 of the filter tank, and by causing the end part of the distributor to travel below this channel, so that the upward sprays from the nozzles in this outer part impinge on the underside of the channel, instead of falling over the filter wall.

Figure 4 also shows a float support for the outer end of the distributor in addition to the inner support by pier 27 and hub 26. For this purpose the siphon pipe 24 has an intake part secured to a float 46 which is adapted to travel in the peripheral channel 20. It will be understood that such a float support can be combined with a motor drive control as shown in Figure 3, the motor drive thus being relieved of all or part of its share of the weight of the distributor and parts mounted thereon. The float may either serve to retard the travel of the distributor, or with tangential inlets and rotating flow in channel 20, the float may serve to accelerate rotation of the distributor. Floats of this kind have been built before but have not been a success, due to varying liquid levels in the float channels. In accordance with my invention, a constant head and level is preserved, and thus, a simple float support can be used with good success.

At some times, the liquid discharge from the trough compartment 23—A may fall below its normal value, due to clogging in some of the nozzles 25, or other conditions. The liquid level in compartment 23—A will then rise and liquid will overflow over the weir 23—C, to be discharged through the nozzles in the auxiliary compartment 23—B. Of course, instead of such an auxiliary compartment, I could provide a separate auxiliary arm similar to that shown in Figure 3; and conversely, I could use the parallel compartments of Figure 4 to take care of the conditions referred to in connection with the central launder previously described. In that event, I would ordinarily have rolling support rather than a float support for the distributor arm.

Figure 5:
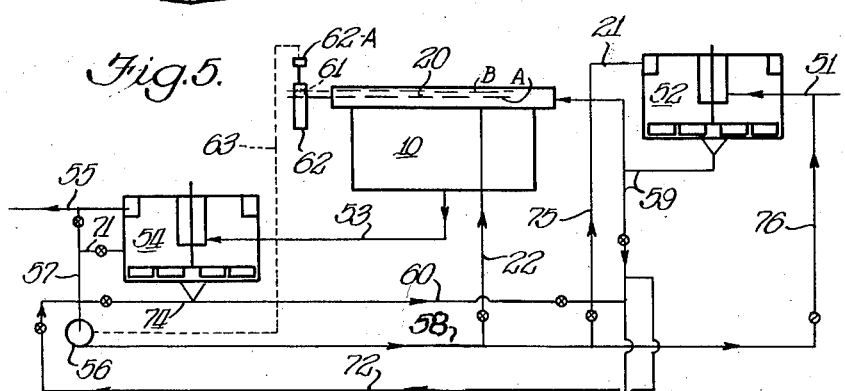
Figure 5 is a diagram of a filter plant constructed in accordance with this invention.

Figure 5 shows a complete filter plant comprising an inlet conduit 51 entering a primary clarifier or solids removing tank 52. The overflow of this tank enters the feed channel 20 of the filter 10 through the feed pipe 21. Filtered sewage is collected in a conduit 53. This enters a secondary clarifier or solids removing tank 54, which overflows to waste, or to further treatment, through conduit 55. A recirculation pump 56 is provided, having a suction pipe 57 communicating with the waste pipe 55. The pump has a discharge pipe 58 connected to the aforementioned pipe 22 entering the filter feed channel. The solids removed in the tanks 52 and 54 are normally passed to waste, to a sludge digester, or to some other treatment device by pipes 59 and 60, joining the two tanks respectively.

I provide a float 61, preferably in a separate float chamber 62 communicating with the filter feed channel 20. This float operates a float switch 62—A which by electrical conductors 63 controls the motor of the recirculation pump 56, so that a substantially constant level and head is maintained in the filter feed channel 20 above the siphon intake 24—A, the variations of such level being kept between two planes A and B above the said intake. For this purpose, the filter distributor, and other parts, are so dimensioned as to provide slightly greater capacity of the filter than of the preceding parts including the feed pipe 21. This will tend to lower the liquid level in the feed channel to a plane A, as the flow to the siphon, distributor and filter goes on. As the liquid level starts to drop in the feed channel, it also drops in the float chamber 62, whereupon the float 61 causes the recirculating pump 56 to start, through the float switch, conductors, and pump motor. Recirculation causes the liquid level in the feed channel to rise, offsetting the starting drop of the liquid level that has been mentioned. When such rise of the liquid level in the feed channel has continued for a short while, the liquid in this channel and in the float chamber 62 is built up to a level B at which the float stops the recirculating pump through the switch and motor. Thus recirculation may begin and end, at irregular times, as governed by the liquid head in the channel, and indirectly governed by sewage flow in pipe 21. The slight variation of liquid level that is required to obtain float operation and control of this recirculation, can be kept small enough to allow the siphon 24 to be flowing at all times, and to have practically constant head on its intake.

In some instances I may prefer to recirculate tank liquor from an intermediate zone between the bottom and overflow of the secondary clarifier 54, since there may be some organisms in such tank liquor which serve well to inoculate the filter. For this purpose, I provide a pipe 71 connecting an intermediate zone of the clarifier with the suction of the recirculating pump. In order to control the withdrawal either from pipe 55 or from pipe 71, or from both, I provide valves in said pipes as shown. I may also want to feed primary sludge to the filter, on account of foodstuffs and other materials that may be contained therein. For this purpose, I provide a valved bypass 72 of the primary sludge line 59, connected to the pump suction. Similarly, I may circulate concentrated secondary sludge to the filter through a valved pipe 74.

As mentioned before, the recirculating material may enter the filter either through a separate pipe 22, or through the sewage feed pipe 21, which for this purpose may be connected to the pump discharge by a valved branch pipe 75. Finally, I may want to return secondary sewage or sludge or both to the primary tank by a valved pipe 76 connecting the pump discharge to the sewage inlet pipe 51.

It should be clearly understood that wherever I refer to the feed, flow or treatment of some liquid, material, or sewage, each of the several flows described is intended to be covered, unless a contrary intent appears from the context. Each of the several flows described in connection with Figure 5 is well-known to the art, in itself. Similarly, feed channels and siphons, such as those described are known in general.

Great advantages result from the use of peripheral feed to the filter in connection with high rate flow of sewage. Such flows have previously been conducted to the center of a circular filter, wasting valuable liquid head. The bulk of the flow is distributed over the outer parts of the filter, but all of the flow was previously conducted through the inner part of a rotary distributor. It is obvious that considerable savings in liquid head are achieved through the shorter and more direct flow provided in accordance with my invention and a finer and more rapid control can be applied.

Furthermore, such liquid heads as were previously brought to the center structure necessitated complicated and expensive seals, which are conspicuous by absence in my improved design. While filter designs devoid of such seals are known, they have not heretofore been a success, and have never, to my knowledge, been used in connection with high rate flows, involving relatively high pressures and particularly troublesome problems of sealing.

A number of other advantages, as well as a number of possible modifications, will suggest themselves to persons skilled in the art, on consideration hereof.

I claim:

1. In a trickling filter, a filter body, an open, deep and narrow channel adjacent an outer edge of said filter body, means for feeding any incoming, unfiltered sewage to said channel, air diffuser means in the bottom of said channel, means adapted to travel along said channel and to distribute sewage from said channel over said filter body, and means for collecting filtered sewage from below said filter body.

2. In a trickling filter according to claim 1, the feature that said channel has its top adjacent the top of said filter body and upwardly spaced therefrom; said means adapted to travel along said channel comprising a siphon, an intake end of said siphon below the top of said channel, but in a plane above the top of said filter, a discharge end of said siphon below said intake end but above said filter body, an elongated distributor connected to said discharge end and substantially radially arranged above said filter body, discharge orifices spaced along said distributor, and means to rotatably support said distributor and siphon; there being provided an outlet in said means for collecting filtered sewage, recirculator means to return amounts of filtered material from said outlet to said channel, control means responsive to a change of the liquid level in said channel from one plane above said siphon intake to another plane above said siphon intake, and means governed by said control means to control said recirculator means so as to maintain said liquid level between said two last-mentioned planes, whereby a substantially constant head is maintained over said siphon intake and air diffuser means.

EWALD A. KAMP.